United States Patent [19]

Stigliani, Jr.

[11] 4,092,061

[45] May 30, 1978

[54] SIDE-COUPLING OF LIGHT FOR AN OPTICAL FIBER

[75] Inventor: Daniel J. Stigliani, Jr., Poughkeepsie, N.Y.

[73] Assignee: International Business Machines Corp., Armonk, N.Y.

[21] Appl. No.: 755,284

[22] Filed: Dec. 29, 1976

[51] Int. Cl.² .................................................. G02B 5/14
[52] U.S. Cl. ..................................................... 350/96.18
[58] Field of Search ............ 350/96 C, 96 R, 96 WG, 350/96 B; 250/227, 552; 240/1 LP; 357/19

[56] References Cited

U.S. PATENT DOCUMENTS

| | | | |
|---|---|---|---|
| 2,035,998 | 3/1936 | Thompson | 350/96 R |
| 2,218,074 | 10/1940 | Smith | 350/96 R |
| 3,177,470 | 4/1965 | Galopin | 350/96 R |
| 3,329,475 | 7/1967 | Hasala | 350/96 R |
| 3,611,359 | 10/1971 | Panerai's | 350/96 R |
| 3,714,447 | 1/1973 | Jallais | 350/96 R |
| 3,859,536 | 11/1975 | Thiel | 250/227 |
| 3,896,305 | 7/1975 | Ostrowsky et al. | 350/96 C |
| 3,952,265 | 4/1976 | Hunsperger | 350/96 WG |

OTHER PUBLICATIONS

Mansbridge et al., "Cutting Tool...", IBM Tech. Dis. Bull., vol. 18, No. 10, Mar., 1976, p. 3431.

*Primary Examiner*—Jon W. Henry
*Attorney, Agent, or Firm*—Harold H. Sweeney, Jr.

[57] ABSTRACT

Light is coupled into and out of an optical fiber from the side by providing an acute angular cut along the end of the optical fiber and locating a light source adjacent the side of the optical fiber opposite the inner facing surface of the cut such that light reflects from the cut surface substantially parallel to the optical axis of the optical fiber. The outer surface of the cut is rendered reflective. The curved optical fiber cladding material between the side located light source or detector and the inner surface of the cut end of the optical fiber acts as a lens to collimate the light from the light source.

4 Claims, 6 Drawing Figures

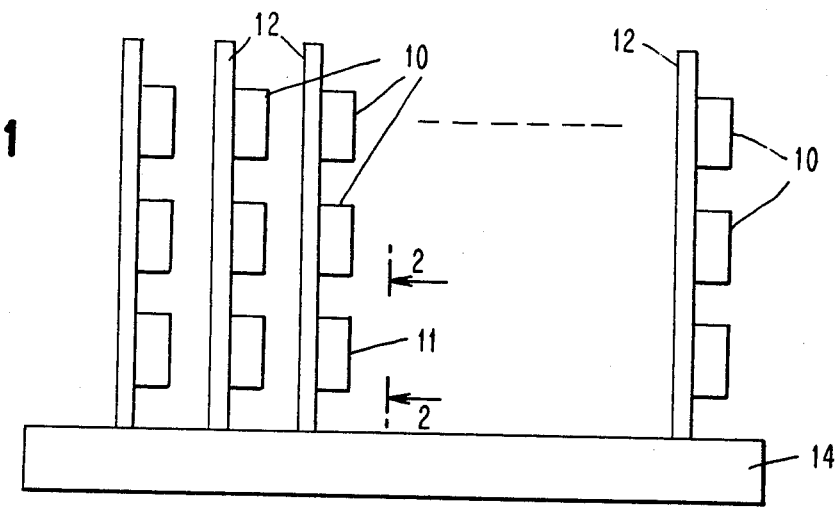
FIG. 1
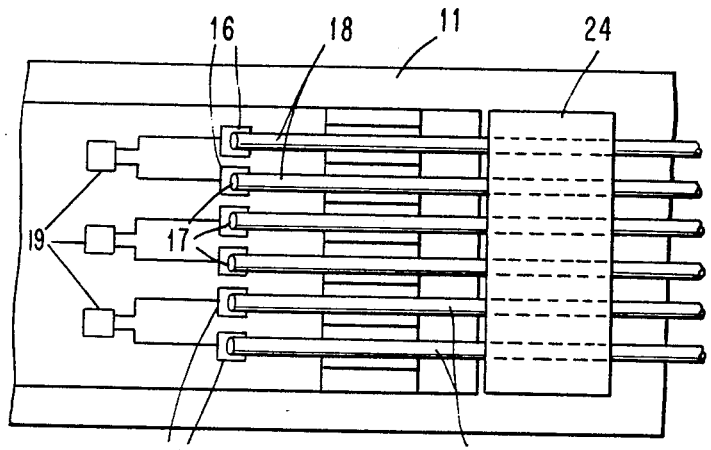
FIG. 2
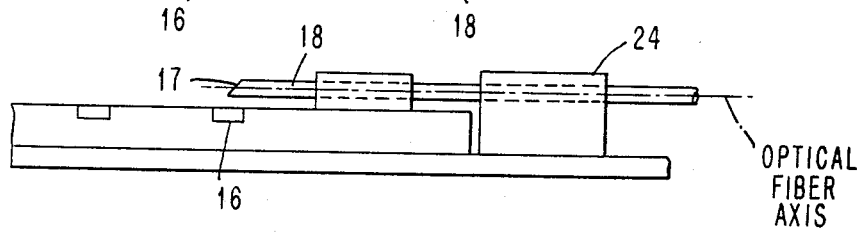
FIG. 3
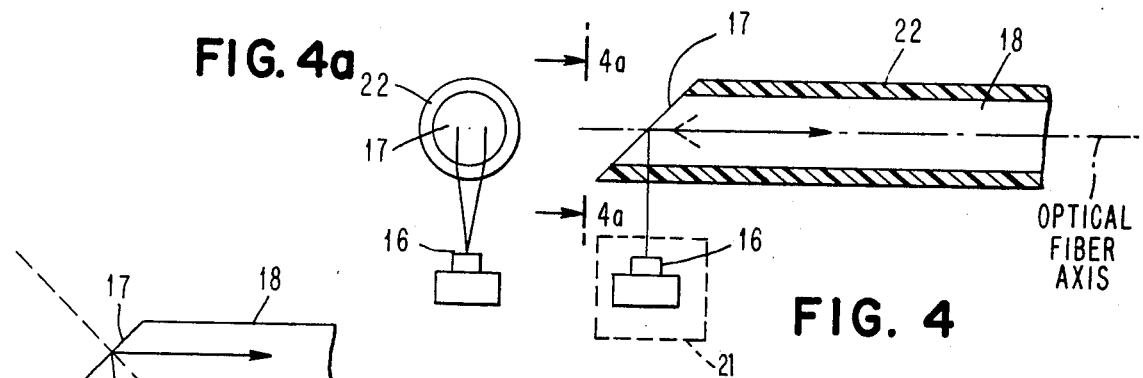
FIG. 4a
FIG. 4
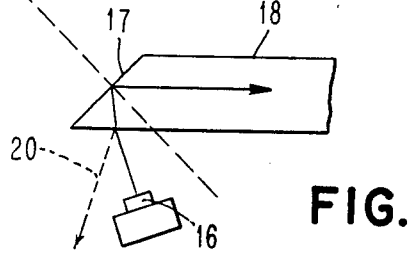
FIG. 5

SIDE-COUPLING OF LIGHT FOR AN OPTICAL FIBER

BACKGROUND OF THE INVENTION

Field of the Invention

This invention relates to the coupling of light into and out of an optical fiber and, more particularly, to the coupling of light into and out of an optical fiber from the side thereof without the use of separate lenses and mirrors.

Optical fibers are now relatively well known light transmission mediums. The most common mode of coupling light into and out of the optical fiber is to butt the end of the fiber to the optical source so that the light is directed straight into the end of the optical fiber. There are many situations where the optical fibers cannot be directly butted to the light source or detector. For example, where the light source is a top surface light emitting diode located in a high density environment such as is found on a card in a package of closesly spaced parallel cards as is found extensively in present day electronic packaging. One solution is to bring in the optical fiber parallel to the card and provide a 90° bend so that the end of the fiber can be butted to the light source or detector. It has been found that the 90° bend creates losses in the optical fiber, particularly in low loss optical fibers, and should be avoided if possible. Another solution to the problem has been to side-couple the light into and out of the optical fiber by the use of a mirror attached near the end of the fiber. A lens can be used between the mirror and the light source to collimate the light and thus provide the coupling of the light into the optical fiber. It will be appreciated that the use of lenses and mirrors in the high density situations afforded by large scale integrated circuitry is just not practical.

SUMMARY OF THE INVENTION

It is the main object of the present invention to provide side coupling of light into and out of optical fibers in high density situations without the use of lenses and mirrors.

It is a further object of the present invention to provide side-coupling of light into and out of an optical fiber where the fiber itself serves as the lens and mirror.

It is another object of the present invention to provide coupling of light into and out of an optical fiber without bending the fiber.

Briefly, the invention consists of providing light coupling into and out of an optical fiber from the side thereof by providing an acute angular cut along the end thereof so that a light source or detector located adjacent the side of the fiber opposite the inner facing surface of the cut will cause light to be reflected from the cut surface into the fiber substantially parallel to the fiber central axis or reflected out of the fiber onto the detector. The outer surface of the cut is rendered reflective. The curved fiber optic cladding material between the light source and the inner surface of the cut end of the fiber can be used as a lens to collimate the light from the light source or image the light onto a detector.

BRIEF DESCRIPTION OF THE DRAWINGS

FIG. 1 is a schematic diagram showing many modules containing light emitting diodes mounted on a card in a high density situation.

FIG. 2 is a schematic diagram taken along line 2—2 of FIG. 1 showing one module containing the light emitting diodes and/or detectors and especially the optical fibers associated therewith.

FIG. 3 is a bottom view of FIG. 2 showing the location of the optical fiber with respect to its associated light emitting diode or detector.

FIG. 4 is a partial cross-sectional view showing the details of the optical fiber.

FIG. 4a is a schematic side view of FIG. 4 showing the fiber acting as the collimating lens.

FIG. 5 is a schematic diagram showing the relationship of the light source and the fiber optic for a non-45° angular cut at the end of the fiber optic.

DETAILED DESCRIPTION OF THE PREFERRED EMBODIMENTS OF THE INVENTION

Referring to FIG. 1, there are shown a number of modules 10 mounted on cards 12 in a high density arrangement. The cards 12 are arranged parallel to one another and are mounted on a substrate 14. At least module 11 contains light emitting diode outputs, the condition of which must be transmitted to a remote point. It should be appreciated that the optical fibers utilized to transmit light in response to the condition of the light emitting diodes, must be positioned parallel to the cards having a module containing the light emitting diodes located thereon. There is insufficient room for the optical fibers to be brought in at 90° to the cards. Positioning the optical fibers parallel to the cards and including a 90° bend to end butt to the light emitting diodes is not desirable for fiber optical transmission. There is also not sufficient room to provide mirrors and lenses to provide side-coupling of the light into the end of the optical fiber. FIG. 2 shows that the optical fibers 18 are brought in parallel to the module 11 and, accordingly, parallel to the card 12 carrying the chip such that the side of the optical fiber 18 near the end thereof is adjacent the LED (light emitting diode) 16. The LEDs 16 are shown energized or driven by drivers 19. The light emitting diodes 16 are top surface emitters and provide a lambertian intensity distribution.

It can be better seen from FIG. 3 that the optical fibers 18 have an acute angular cut 17 at the ends thereof. The preferrable cut is 45° with respect to the fiber axis and, as can best be seen in FIG. 4, the light source 16 is located with respect to the cut 17 such that the light emitted in a plane perpendicular to the fiber axis is reflected into and parallel to the axis of the optical fiber. If the light source 16 is replaced by a detector 21 (see FIG. 4), the light traveling parallel to the fiber axis toward the cut 17 is reflected out of the fiber thru the cladding lens to the detector. It must be kept in mind that only the reflected light from the 45° cut which is within the numerical aperture of the fiber will be coupled into the optical fiber. The cut is not limited to 45° but, as shown in FIG. 5, can be any acute angular cut which in combination with an appropriately located light source will provide reflection of the incident light along the axis of the fiber. The 45° angular cut is preferred since the Fresnel reflection from the optical fiber itself is minimized. Referring to FIG. 5, the Fresnel reflection 20 is shown for a non-45° angular cut.

The angular cut 17, as shown in FIG. 4, can be obtained by cutting with a diamond wheel. This provides a very smooth surface which has proved to be highly reflective via total internal reflection. The outer surface of the cut 17 can have a reflective material coated thereon to provide the required reflective qualities. A thin coating of aluminum has proved to be successful. The coating was deposited by an evaporative process and has to be sufficiently thick to be substantially reflective. The cut can be made in the end of the optical fiber by encapsulating the end of the fiber in an epoxy and making the cut through the epoxy and the cable. This tends to hold the small fiber fixed while cutting. The cutting can be provided in this manner to a single fiber or a plurality of fibers. A glass fiber which has been successfully used in this side-coupling technique has been a fused silica glass having a core diameter of 0.003 inch. The overall diameter was 0.005 inch. The numerical aperture of this optical fiber was 0.14 inch. The cladding 22 shown in FIG. 4 has a slightly different index of refraction than the core glass. The curvature of the optical fiber acts as a collimating lens between the light source and the cut surface as can be seen in FIG. 4a. The placement of the light source 16 is important with respect to the angular cut of the optical fiber, as has been previously mentioned, and the vertical height of the optical fiber with respect to the light source is also important for maximum light collection into the fiber and in situation where there are more than one LED and the adjacent light sources are close. The optical fibers are kept relatively close to the light source in order to minimize the light spreading loss so that any adjacent light source has a minimal affect on the optical fiber on either side. The height positioning of the optical fiber as well as the lateral positioning is obtained by a groove arrangement which can be built into the chip itself or which can be added thereto. These grooves are of the correct height and location with respect to the diode such that the optical fiber when laid therein, as shown in FIG. 2, will be correctly positioned with respect to the LED. A locating and holding member 24 is formed at a predetermined distance from the end of the optical fibers so that it can butt up against the edge of the module and thus position the optical fiber cut end directly over the LED.

The light can be coupled from the optical fiber 18 using the same or similar angular reflecting cut surface 17 and cladding lens in the fiber itself as was used in coupling the light to the fiber. A light detector 21 may replace the light source and is located at the same position with respect to the angular cut surface 17 of the fiber 18 as the light source. The light traveling through the fiber reflects from the angular cut surface onto the detector.

While the invention has been particularly shown and described with reference to the embodiments thereof, it will be understood by those skilled in the art that the foregoing and other changes in form and detail may be made therein without departing from the spirit and scope of the invention.

What is claimed is:

1. In an optical fiber of the type having a transparent cladding thereon of a different index of refraction than the fiber core for providing light coupling thereto from the side of said fiber comprising:
    an acute angular cut with respect to the center axis of said optical fiber located along at least one end of said optical fiber;
    means for rendering the outer surface of said cut reflective;
    a light source located adjacent the side of said optical fiber opposite the inner facing surface of said cut such that light reflected from said cut surface will be substantially parallel to and within said optical fiber;
    the curved optical fiber cladding material having an index of refraction and curvature so that when located between the light source and said inner surface of said cut end of said optical fiber it acts as a lens to collimate the light emitted from said light source in a plane perpendicular to said center axis.

2. In an optical fiber for providing light coupling thereto from the side of said optical fiber according to claim 1, wherein said cut is at an angle 45° and said light source is located at the side of said optic fiber such that the light intercepts the inner facing surface of said cut at a 45° angle and reflects therefrom parallel to the axis of said optical fiber.

3. In an optical fiber for providing light coupling thereto from the side of said optical fiber according to claim 1, wherein a plurality of optical fibers are utilized each lying in substantially the same plane and each having the same acute angular cut along the end thereof and each having a separate light source located adjacent the side of the respective optical fiber opposite the inner facing surface of said cut.

4. In an optical fiber for providing light coupling thereto from the side of said optical fiber according to claim 1, wherein the outer surface of said cut is rendered reflective by a coating of reflective material located thereon.

* * * * *